Jan. 13, 1959   E. P. ANSTETT   2,867,807
DRIVEN TYPE FASTENER
Filed Dec. 16, 1955   2 Sheets-Sheet 1
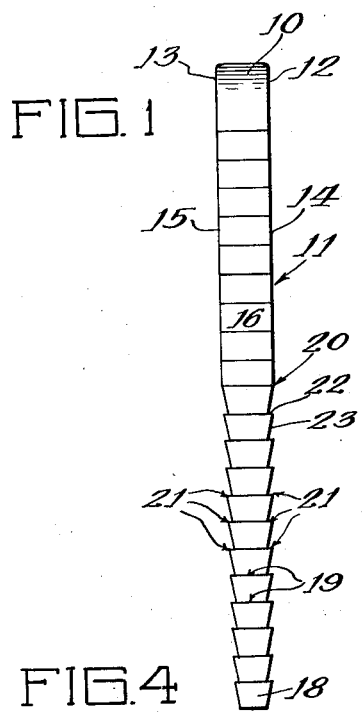
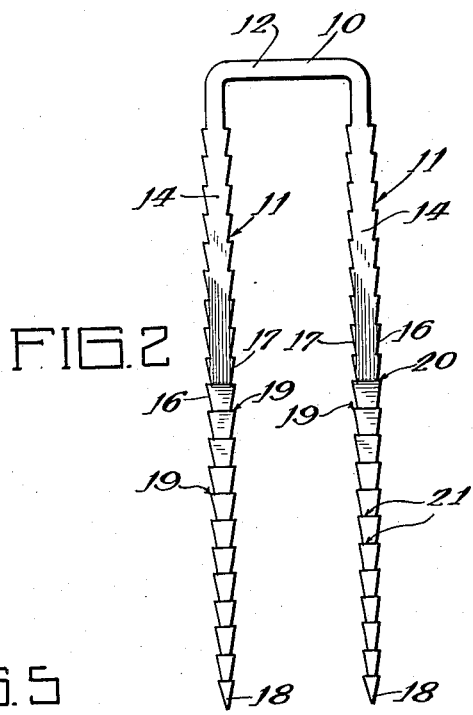
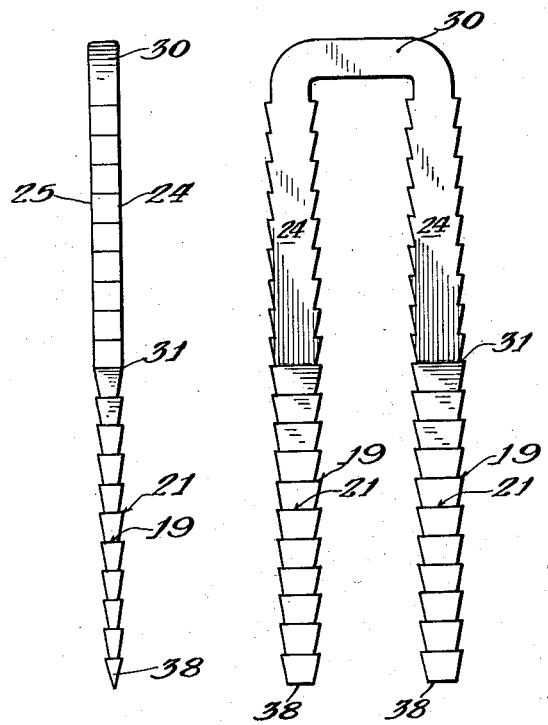
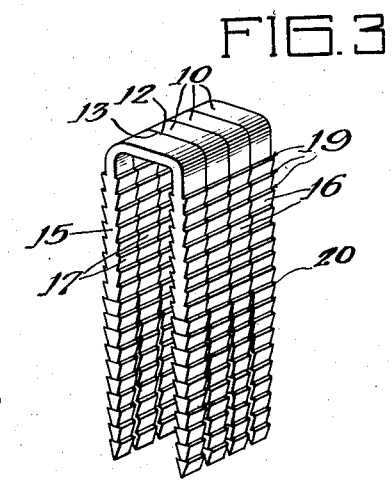
Inventor:
Edgar P. Anstett
By: Schrader, Hofgren,
Brady & Wegner
Attorneys Jan. 13, 1959  E. P. ANSTETT  2,867,807
DRIVEN TYPE FASTENER
Filed Dec. 16, 1955  2 Sheets-Sheet 2
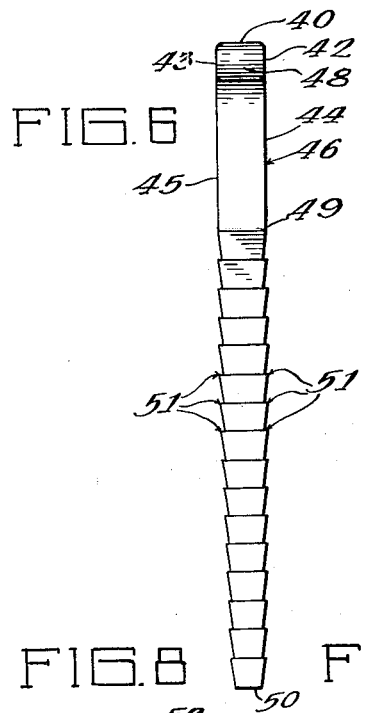
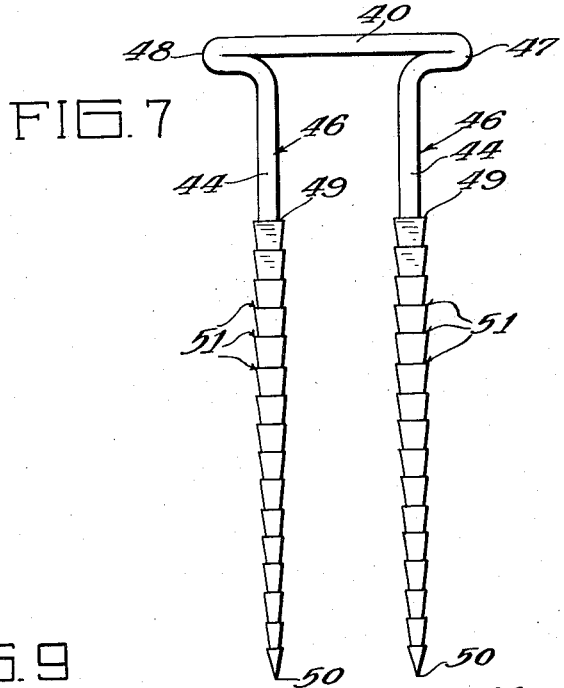
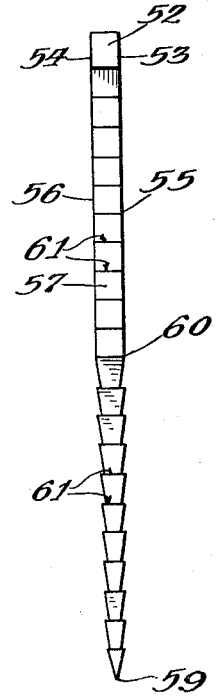
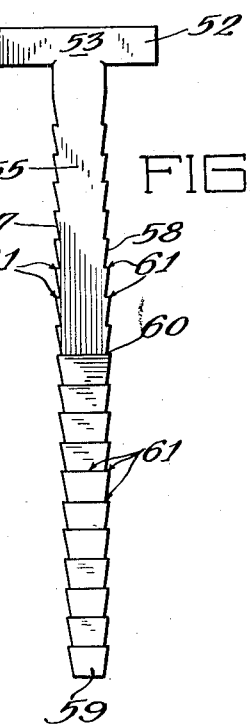
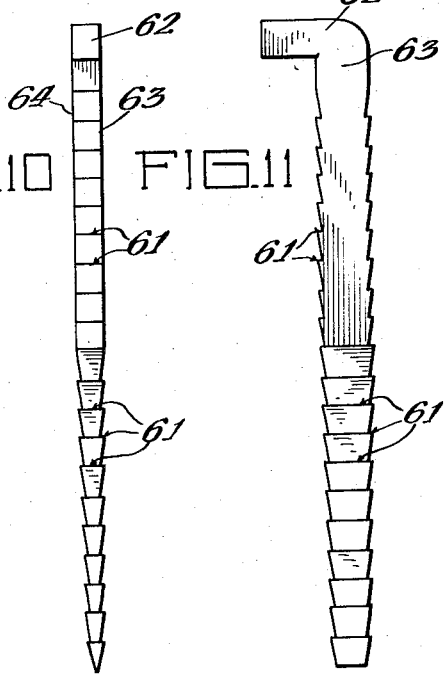
Inventor:
Edgar P. Anstett
By: Schroeder, Hofgren,
Brady & Wegner
Attorneys

United States Patent Office 2,867,807
Patented Jan. 13, 1959

2,867,807

DRIVEN TYPE FASTENER

Edgar P. Anstett, Chicago, Ill.

Application December 16, 1955, Serial No. 553,489

2 Claims. (Cl. 1—56)

This invention relates to a driven type fastener made from a wire product.

One of the principal objects of the invention is to provide a fastener of metal intended for driving into material in which it will be retained against a withdrawing force which is larger than necessary to withdraw other types of fasteners. The present fastener has a material penetrating shank so constructed that the holding power of the fastener is several times that of the usual straight shank fastener such as nails commonly used by carpenters.

Another object of the invention is to provide a driven type fastener with a barbed shank having portions permitting the stacking of the fasteners together forming a stick for use in a driving machine.

A further object of the invention is to provide a driven type fastener with a material penetrating shank which is tapered progressively from its head to its point and is provided with barbs in its tapered surfaces cooperating with the taper to greatly increase its holding power in comparison with the fasteners having straight shanks.

A further object of the invention is to provide a driven type fastener having a penetrating shank formed so as to be driven straight into material such as wood.

A still further object of the invention is to provide a driven type fastener which may penetrate wood material with minimum shearing, shaving or wearing away of the adjacent wood fibers when driven.

Other objects, features and advantages of the present invention will be apparent from the following description of embodiments of the invention illustrated in the accompanying drawings in which:

Figure 1 is a side elevational view of a staple having the invention therein. Figure 1 and all of the figures are greatly enlarged in order to show the details of construction;

Figure 2 is a front elevational view of the staple illustrated in Figure 1;

Figure 3 is a perspective view of four staples as illustrated in Figures 1 and 2 glued together in a stick for use a driving machine;

Figure 4 is a side elevational view of another staple similar to Figure 1 but thinner in section;

Figure 5 is a front elevational view of the staple illustrated in Figure 4;

Figure 6 is a side elevational view of a modified staple;

Figure 7 is a front elevational view of the staple illustrated in Figure 6;

Figure 8 is a side elevational view of a T-headed nail embodying the invention;

Figure 9 is a front elevational view of the nail fo Figure 8;

Figure 10 is a side elevational view of a L-headed nail embodying the invention; and Figure 11 is a side elevational view of the nail illustrated in Figure 10.

The present fasteners whether of staple or nail form are intended for use in a nailing machine. Generally, such machines have a supply track for receiving a stick of fasteners which comprises a plurality of the fasteners glued together to form the stick. Individual fasteners are sheared from the front of the stick by a plunger which drives them out of the machine into some material. The driving plunger may be operated mechanically by striking it with a mallet or hammer or it may be operated by power driving apparatus involving the use of compressed air or other means. The nailing machines, by using a relatively long stick of fasteners thus has a supply permitting the driving of the fasteners generally as fast as the operator wishes, limited only by the speed with which he can manipulate the machine. Each of the forms of the fasteners illustrated in the drawings is intended for use in the machines of the type above described. All of them have structure by which they are capable of placement in a supply stick.

Referring particularly to Figures 1 through 3, there is illustrated a staple form of fastener which may be formed from a wire stock. The staple has a head 10 joining a pair of shanks generally indicated 11. The form of the shanks is of particular importance. Generally, the shanks have four sides rolled into the wire stock so that adjacent sides are generally normal to each other. Two sides, 12 and 13, of the head are parallel. The adjoining sides, 14 and 15, of the shanks are also parallel and coplanar with the sides 12 and 13 of the head. This is provided for the purpose of stacking the staples together in a straight stick as is illustrated in Figure 3. The straight flat sides 14 and 15 of the shank extend away from the head only a short distance comprising a portion of the total length of the shank in order that the staples will abut one against the other in the head section and at least along a portion of the shanks. This insures that the staples may be stacked in a straight stick as is most convenient for use in the nailing machines.

The sides 16 and 17 of the shanks joining the sides 14 and 15 are given a taper from the head 10 to the penetrating end 18 of the shanks. In addition to the taper, barbs 19 are formed on both sides 16 and 17 substantially along the whole length of the shank. These barbs are rolled into the metal of the shank and follow the taper placed in the sides. Tests have shown that holding power of the shank in materials such as wood is greatly increased by the cooperative effort of the barbs with the tapered shank. A taper generaly between .015 of an inch and .020 of an inch per inch length has been found to give the best resistance to withdrawing. The sides 16 and 17 are both tapered within this range and the barbs 19 are formed in the sides after they have been given this taper.

The lower portion of the sides 14 and 15 of the shank are also given a taper within the above specified amount. Starting generally at the point 20 and extending downwardly along the shank to the point 18, the sides 14 and 15 are tapered inwardly toward each other and are also provided with barbs 21 similar to the barbs 19.

The above structure results in a fastener shank which has a portion of two opposite sides formed with flat surfaces coplanar with parallel sides of the head in order that it may be stacked with similar fasteners in a stick. Additionally, all other surfaces of the fastener shank are given the specified taper toward the penetrating free end with all tapering surfaces provided with barbs. Preferably, the barbs are of the type presenting the least resistance to driving of the fastener and the greatest resistance to withdrawal. Thus, the barbs are of the type having faces 22 generally normal to the shank length and facing the head end of the fastener as is illustrated in the drawings. The sloping side 23 of the barb extends from the outer point of one barb to the inner extremity of the next lower barb face 22.

Contrary to the practice followed with other staple fasteners, the present staple is intended to penetrate straight into wood or other material. The tapered shanks tend to keep the fastener in a straight line as the wood fibers are parted and moved aside to pass the shanks. The symmetry of the tapered sides maintains the shanks in a straight penetrating line. While it is preferred that the points at the penetrating ends of the shanks be formed as illustrated in the drawings for straight penetration into material, it is also contemplated that the points might otherwise be formed for use in operations requiring clinching or other types of desired operation of the shank once entering the material. The taper provided also minimizes the shearing or shaving of the wood fibers and the barb form helps the taper to merely push the wood fibers aside permitting the displaced fibers to return in against the barbs once the fastener is seated. Since the wood fibers are not particularly broken by the entry of the fastener shanks and the taper in cooperation with the barbs provides good holding all along the shanks, it has also been found that moisture content changes in wood have less effect in loosening the fastener than previously experienced. A nail having a shank of the same section throughout often is worked loose merely by the swelling and retracting of the wood around it. A pumping action seems to occur which actually may back the nail out of the hole formed in driving it. The present invention, however, eliminates this difficulty since the tapered shanks provide holding all along the shank with some of the barbs always tightly held in the wood fibers to prevent any "backing out" of the fastener.

The fasteners may be made by rolling the desired configuration into metal wire stock. Ferrous metals and metal alloys as well as alloys of lighter metals may be used for making the fasteners. The end use of the fasteners generally dictates the material of which they are made.

The fastener of the present invention is readily adaptable for use with both soft and hard woods. The form shown in Figures 1 through 3 is preferred for soft woods since the thickness of the shanks is such to displace a relatively large amount of wood and achieve good holding power. A thinner section is desired, however, in nailing hard woods. In the latter case, the primary difficulty is in splitting since good contact may easily be obtained between the fastener and the wood fibers. The staple form illustrated in Figures 4 and 5 is preferred for hard woods and for nailing both wood types in edge nailing or close to the edge. For example, tongue and groove flooring and nailing within five-sixteenths of an inch of the edge of a board may be successfully accomplished with fasteners of the present invention, using one of thinner section.

A staple type fastener of thinner section as measured in the direction across the head is illustrated in Figures 4 and 5. The staple is formed similar to that illustrated in Figures 1 to 3 except that the thickness between the sides 24 and 25 is much less than between the comparable sides of the staple shown in Figure 1. The head 30 appears thicker in depth as compared to that in Figure 2 because of the steps followed in rolling the wire product to make the staples. The taper is provided on the comparable sides of the staple shanks in the same manner as specified for the staple of Figures 1 to 3. The sides 24 and 25 are tapered from the point 31 downwardly to the penetrating point 38. While reference has been made to the penetrating point of the staple, it will be understood that the point is more like a wedge in that it has a breadth as illustrated in Figures 1 and 5. Barbs 19 and 21 are formed in the same configuration as specified for the staple form in Figures 1 to 3 in the comparable sides.

Figures 6 and 7 illustrate a modified form of a staple wherein the head 40 has sides 42 and 43 coplanar with the adjacent sides 44 and 45 of the shanks so that it will be stacked with similar fasteners but has a slightly different head and shank form. The upper portions 46 of the shanks are left free of barbs. The head has outwardly extending portions 47 and 48 projecting laterally of both the shanks in order to provide the staple with a structure for holding such materials as roofing. The outer extending portions of the head may bear against the roofing much in the same manner as is commonly experienced with a round headed roofing nail. Tearing of the roofing material is thus avoided by the head of the staple clamping against the roofing beyond the hole in the roofing made by the passage of the shanks through the material.

While the upper end 46 of the shanks of the staples illustrated in Figures 6 and 7 are free of barbs, the lower portions beginning generally at the point 49 and extending to the penetrating end 50 are tapered within the specified amount and are provided with barbs 51 on all sides, formed as specified for those on the staple form of Figures 1 to 3.

Two forms of nails are illustrated in Figures 8 to 11 both embodying the features of the present invention. In Figures 8 and 9, the head 52 is in the form of a T. Opposite sides 53 and 54 are parallel and coplanar with adjoining sides 55 and 56 of the shank. The joining sides 57 and 58 are given a taper from near the head to the penetrating point 59 and provided with barbs. The portions of the sides 55 and 56 below the point 60 are also tapered and provided with barbs as described above for the shanks of the staple forms.

The nail of Figures 10 and 11 differs from that of Figures 8 and 9 only in the form of its head 62 which is L-shaped. This type of nail is readily usable in commercially available nailing machines having a rail from which to suspend the nails by the L-shaped head. The sides 63 and 64 of the shanks are coplanar with sides of the heads for the purpose of stacking the nails in a stick and the usual tapers and barbs are provided as specified above for the shanks of the other fasteners.

The nails of Figures 8 to 11 may have a relatively thin section as illustrated in Figures 8 and 10 so as to make the nails particularly useful in nailing hard woods or in nailing close to edges. The barbs cooperate with the taper provided to obtain good holding power with the barbs 61 being formed in the same manner as specified for the staple form shown in Figures 1 to 3. Here, also, the shank sides are all tapered to the penetrating end so that the nails tend to drive straight rather than deflect to one side as they penetrate.

It has been known to provide a nail with a roughened surface or with some there has been a thread acting as a barb in an attempt to increase its holding power. The present invention provides a structure capable of much greater holding power than any previously known. It is believed that the combination of the barbs and the taper on the shank contribute to the improved result. At the same time, there is provided a fastener either in staple or nail form which may be stacked one against the other to provide a straight stick readily usable in the simplest type of nailing machines. This permits rapid driving of the fasteners and particularly easy handling. The particular form of the fastener may readily be changed to meet requirements of the particular fastening job to be done. Both nail and staple forms have been illustrated with variations in the head shape. It is contemplated that other changes in the head form may be desirable aso conditions of use require. Each of the forms, however, gain the benefit of the improved holding power accomplished by the tapered and barbed shanks.

The foregoing detailed description has been given for clearness of understanding only, and no unnecessary limitations should be understood therefrom, for some modifications will be obvious to those skilled in the art.

I claim:

1. An assembly of fasteners of a type intended for driving, comprising a plurality of similar fasteners each provided with a head and an elongated shank, said head having a pair of opposite substantially flat parallel sides, said shank terminating in a free penetrating end of reduced thickness section smaller than the remainder of the shank, said shank having an upper portion adjacent the head and a lower portion adjacent the penetrating end, the upper portion of each shank having a pair of opposite flat sides each coplanar with one of the opposite sides if its adjacent head and the lower portion having two pairs of opposite barbed sides, the barbed sides of one pair being continuations of said opposite flat sides and each extending from a flat side of said upper portion and gradually tapering toward the opposite side and toward the section of reduced thickness at the penetrating end of the shank, said coplanar flat sides of the head and upper shank portion of each fastener being adhered to corresponding flat sides of the head and upper shank portion of an adjacent fastener to form the assembly in a straight stick for use in a driving machine, said two pairs of opposite barbed with both tapered and barbed surfaces for maximum sides providing the lower portion of each fastener shank resistance to withdrawal from material into which driven.

2. An assembly of fasteners as specified in claim 1 wherein each fastener has a pair of said shanks with said head integral with both shanks.

References Cited in the file of this patent

UNITED STATES PATENTS

| | | |
|---|---|---|
| 131,080 | Blake | Sept. 3, 1872 |
| 166,659 | Van Wagenen | Aug. 10, 1875 |
| 1,478,932 | Wetz | Dec. 25, 1923 |
| 1,998,991 | Heller | Apr. 23, 1935 |
| 2,380,655 | Lang | July 31, 1945 |
| 2,428,259 | Anstett | Sept. 30, 1947 |

FOREIGN PATENTS

| | | |
|---|---|---|
| 19,672/29 | Australia | Apr. 24, 1929 |
| 930,844 | Germany | Aug. 16, 1955 |